Patented Nov. 20, 1934

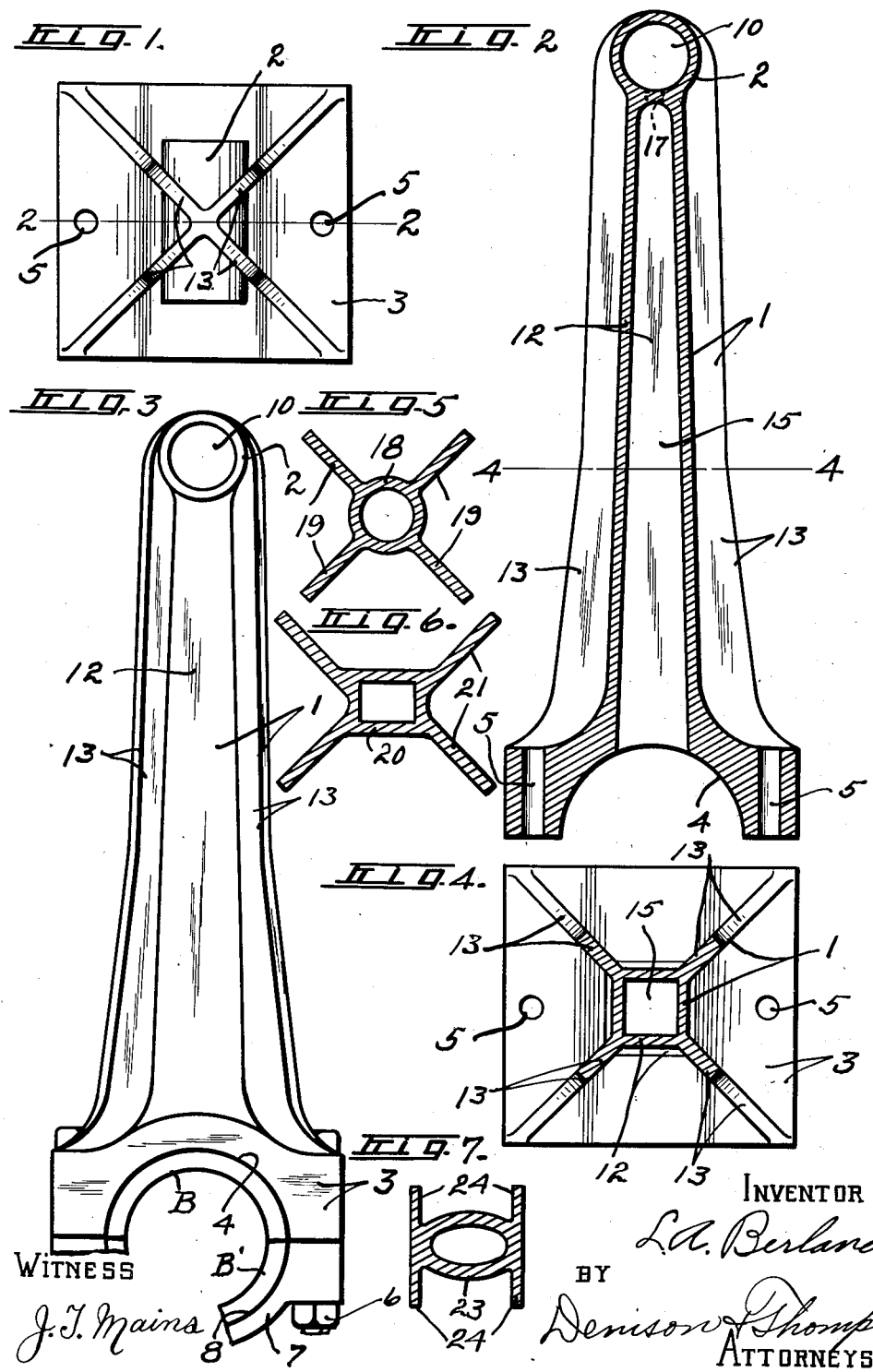

1,981,609

UNITED STATES PATENT OFFICE 1,981,609

CONNECTING ROD

Leon Antoine Berland, Seine, France

Application May 6, 1932, Serial No. 609,677

2 Claims. (Cl. 74—579)

This invention relates to connecting rods and pertains more particularly to a pitman or connecting rod composed of aluminum alloy or other similar lightweight material and adapted to be used in internal combustion engines.

The main object of this invention is to produce a connecting rod of the above-mentioned class which is comparatively light in weight and which will have a strength equal to or greater than that of conventional connecting rods formed of steel.

Another object is to provide such a connecting rod with a longitudinal passageway during the formation of the rod which may be readily utilized as an oil duct for supplying lubricant to the wrist pin bearing.

Another object of this invention is to produce a connecting rod which may be case from molten metal under heavy pressure in permanent molds, as, for instance, in a die casting machine.

In carrying out the above-mentioned objects, I have constructed a connecting rod composed of aluminum alloy or the like which is symmetrical in cross section, that has the same moment of inertia in two directions and wherein the strengths are equal to or even greater than in the conventionally constructed connecting rods composed of steel or like material.

Other objects and advantages relating to the form and construction of the rod, will more fully appear from the following description, taken in connection with the accompanying drawing in which:—

Figure 1 is an end view of my novel connecting rod as viewed from the wrist pin end.

Figure 2 is a longitudinal sectional view taken on line 2—2, Figure 1.

Figure 3 is a plan view of the rod illustrated in Figure 1 with a cap secured to the head end of the rod.

Figure 4 is a transverse sectional view taken in the plane of the line 4—4, Figure 2.

Figures 5, 6 and 7 are transverse detail sectional views similar to Figure 4, each view illustrating a modified form of the tubular body portion of the shank of my novel connecting rod and the arrangement of the flanges radiating therefrom.

As illustrated in the drawing, my novel connecting rod comprises an elongated shank portion 1 having a wrist pin boss 2 made integral with one end thereof and a head portion 3 made integral with the opposite end of the shank.

The head 3 is substantially square in plan view, as clearly illustrated in Figures 1 and 4, and has the outer face thereof provided with a semi-cylindrical recess 4 adapted to receive therein a suitable semi-cylindrical bearing member B.

The head 3 is also provided with a pair of holes 5 arranged one at either side of the recess 4 substantially midway between the ends thereof for receiving a suitable bolt or screw 6 therethrough. These screws or bolts 6 are for the purpose of removably securing a cap 7 to the head 3, which has the inner face thereof provided with a semi-cylindrical recess 8 similar to the recess 4 for receiving therein a companion bearing member B' similar to the bearing member B positioned in recess 4 so that the crank of a drive shaft may be positioned between said bearing members and the connecting rod may be removably secured to said crank in the conventional manner.

The wrist pin boss 2, in this instance, is a cylindrical member of less length than the head 6 and has an opening 10 extending longitudinally therethrough adapted to receive a wrist pin therein or receive a bearing bushing member adapted to receive the wrist pin. The shank 1 for connecting the wrist pin boss 2 and the head 3 is composed of a body member 12 arranged co-axially with the rod and four substantially equal flanges 13 which radiate from a common center and at substantially right angles to each other.

The body 12, in this instance, is substantially rectangular in cross section and is tapered inwardly from the head portion 3 towards the wrist pin boss 2. A central passage 15 is formed in the body 12 during the casting of the rod and extends from the recess 4 upwardly to within a short distance of the opening 10 provided in the wrist pin boss 2. This passageway 15, in this instance, is shown rectangular in cross section and tapered inwardly from the recess 4 upwardly to its inner end to correspond to the taper of the walls of the body 12, thereby forming a relatively thin body wall substantially uniform in cross-sectional area from the head 3 to the wrist pin boss 2. In other words, the body 12 of the shank 1 is a tubular member rectangular in cross section and tapered inwardly from the head 3 to the wrist pin boss 2, with the upper end of the passageway 15 terminating a short distance from the opening 10 so that said passageway may be readily brought into communication with the opening 10 by drilling a suitable hole in the upper end wall of said passageway, as indicated by dotted lines at 17, Figure 2.

The flanges 13, in this instance, extend outwardly at right angles to each other from the respective corners of the body 12. The upper end of the flanges extend outwardly a relatively short distance beyond the periphery of the wrist pin boss 2 at diametrically opposite sides of said boss and have their ends curved inwardly to extend over the upper surface of the boss at substantially forty-five degrees to the axis thereof and to form relatively narrow reinforcing flanges over the upper surface of the boss. These flanges have their outer edges extending downwardly from the wrist pin boss 2 in substantially parallel planes a distance equal to or greater than one-half the length of the body portion 12 and then extend outwardly in diverging planes with the lower end merging into the upper face of the head portion 3 at respective corners thereof.

It may now be understood that I have provided a connecting rod formed of aluminum alloy and which has a shank portion symmetrical in cross section and formed of a tubular body portion of relatively large cross-sectional area which is reinforced by a plurality of, in this instance four, outwardly extending flanges arranged at right angles to each other and to extend outwardly at diametrically opposite sides of the body portion in such a manner that maximum width flanges will require a minimum of space so that an exceptionally strong durable shank is thereby formed and which, due to the relatively light material from which the connecting rod is made, produces an exceptionally strong connecting rod and one which is much lighter in weight than the conventional rod made from other material such as steel forgings or the like.

In Figures 5, 6 and 7, I have shown certain modified forms of my novel connecting rod tubular body, together with possible arrangements of the radiating flanges. In Figure 5, for instance, I have illustrated the tubular body as 18 circular in cross section, with the flanges as 19 radiating from the body in equal circumferential spaced relation and from the center of the tube.

In Figure 6, the tubular body as 20 is shown as being substantially rectangular in cross section, while the flanges as 21 radiate from each corner of the body in unequal circumferential spaced relation and from different centers. In Figure 7, I have shown the tubular body as 23 being elliptical in cross section with the flanges 24 extending across opposite sides of the body in substantially parallel relation. The ends of these tubular members and flanges may be connected at their ends with the head portion and wrist pin boss in a manner similar to that shown in Figures 1 to 4 inclusive or in any other well-known manner, and although I have shown and described the preferred form of my invention, I do not wish to be limited to the exact construction shown, as it is obvious that various changes in the shape and relative sizes of the tubular body and flanges may readily be made without departing from the spirit of this invention, as set forth in the appended claims.

I claim:

1. A one piece connecting rod member composed of aluminum and comprising a wrist pin boss portion, a substantially rectangular head portion having a semi-circular bearing recess, a shank connecting said boss and head portions, said shank comprising a tubular body portion and four substantially equal flanges radiating from a common center and at substantially right angles to each other, said flanges having the upper ends thereof extended over the upper surface of the boss portion to reinforce said boss and the lower ends of the flanges flaring outwardly and merging into the head portion at respective corners thereof.

2. A one piece connecting rod member composed of aluminum and comprising a wrist pin boss portion, a substantially rectangular head portion having a semi-circular bearing recess, a shank connecting said boss and head portions, said shank comprising a tubular body portion of rectangular cross section, and four approximately equal flanges each radiating from a respective corner of the body portion and having the upper ends extending over the upper surface of the boss to reinforce said boss and the lower ends of the flanges flaring outwardly and merging into the head portion at a respective corner thereof.

LEON ANTOINE BERLAND.